(12) United States Patent
Arul

(10) Patent No.: US 11,285,899 B2
(45) Date of Patent: Mar. 29, 2022

(54) GUARD ASSEMBLY

(71) Applicant: Caterpillar Inc., Peoria, IL (US)

(72) Inventor: Samuel Judson William Arul, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 154 days.

(21) Appl. No.: 16/856,516

(22) Filed: Apr. 23, 2020

(65) Prior Publication Data
US 2021/0331642 A1 Oct. 28, 2021

(51) Int. Cl.
*B60R 21/11* (2006.01)
*B60P 1/28* (2006.01)
*B62D 33/06* (2006.01)

(52) U.S. Cl.
CPC ............... *B60R 21/11* (2013.01); *B60P 1/28* (2013.01); *B62D 33/06* (2013.01)

(58) Field of Classification Search
CPC ....... B60R 21/11; B60R 21/13; B60R 21/131; B60R 21/186; B60R 2021/0253; B60R 2021/137; B60R 2021/0081; B60R 2021/0083; B60R 2021/0076; B62D 25/06; B62D 33/06; B60P 1/28; B60P 1/283; B60P 1/286; E02F 9/163
USPC .......................... 296/187.13, 190.03; 280/756
See application file for complete search history.

(56) References Cited

U.S. PATENT DOCUMENTS

| | | | |
|---|---|---|---|
| 4,095,839 A * | 6/1978 | Lawrence | B60R 21/11 296/190.03 |
| 6,592,172 B2 | 7/2003 | Fujan et al. | |
| 7,025,407 B2 | 4/2006 | Medel | |
| 7,131,686 B1 * | 11/2006 | Jo | B62D 33/0617 296/190.03 |
| 9,027,986 B2 * | 5/2015 | Karami | E02F 9/163 296/190.03 |
| 9,321,385 B2 | 4/2016 | Annetts | |
| 10,005,348 B1 * | 6/2018 | Zaremba | B60J 7/04 |
| 10,202,063 B1 * | 2/2019 | Gist | B60P 7/0846 |

(Continued)

FOREIGN PATENT DOCUMENTS

| | | |
|---|---|---|
| CN | 201677776 | 12/2010 |
| CN | 204432479 | 7/2015 |

(Continued)

OTHER PUBLICATIONS

Written Opinion and International Search Report for International Patent Appln No. PCT/US2021/028074, dated Jul. 30, 2021 (10 pgs).

*Primary Examiner* — Gregory A Blankenship

(57) ABSTRACT

A guard assembly for a canopy of a machine includes a roof portion defining a first end, a second end, and a first length. The guard assembly includes at least two bracket members fixedly coupled to the roof portion. The at least two bracket members define a plurality of first through-holes and a plurality of second through-holes. Each of the plurality of first and second through-holes aligns with a corresponding aperture of the plurality of apertures in the frame member to receive a mechanical fastener therethrough. The guard assembly also includes at least two first support structures spaced apart along a first length defined by the roof portion. The guard assembly further includes at least one second support structure extending along the first length defined by the roof portion.

20 Claims, 8 Drawing Sheets

(56) References Cited

U.S. PATENT DOCUMENTS

| | | | |
|---|---|---|---|
| 10,384,631 B2* | 8/2019 | Kesani | E02F 9/163 |
| 10,857,962 B2* | 12/2020 | Ficheux | B62D 33/0617 |
| 2013/0178857 A1* | 7/2013 | Ye | B23B 31/10 |
| | | | 606/80 |
| 2014/0015279 A1 | 1/2014 | De Paula e Silva et al. | |
| 2014/0292032 A1* | 10/2014 | Sasaki | B60R 21/11 |
| | | | 296/190.03 |
| 2019/0009743 A1* | 1/2019 | Kesani | E02F 9/163 |
| 2019/0263311 A1 | 8/2019 | Robbs | |
| 2019/0291622 A1* | 9/2019 | Moyna | B62D 33/027 |
| 2020/0086818 A1* | 3/2020 | Sheets | B62D 33/06 |
| 2021/0331642 A1* | 10/2021 | Arul | B60R 21/11 |

FOREIGN PATENT DOCUMENTS

| | | |
|---|---|---|
| CN | 209274450 | 8/2019 |
| WO | 2014011643 | 1/2014 |

\* cited by examiner

GUARD ASSEMBLY

TECHNICAL FIELD

The present disclosure relates to a guard assembly, and more particularly to the guard assembly for a machine.

BACKGROUND

Machines, such as trucks, have a body portion to carry payload from one location to another and a canopy that extends from the body portion. During a work operation, various materials may fall towards the machine proximate to a walking area around an operator cabin of the machine or on machine components, for example, mirrors, muffler tips, etc. Such materials may include rocks, debris, some of the payload being loaded on the machine, and the like. The machine components may be exposed to such falling materials and the machine components may be prone to damage. For example, materials falling on the mirrors may cause damage to the mirrors. Typically, a number of guard assemblies are attached to the canopy to deflect such material from falling on the walking area or the machine components.

Such guard assemblies are generally attached to the canopy by welding. During work operation, materials falling on the guard assemblies may damage the guard assemblies. In such cases, the guard assemblies may have to be replaced or serviced in a timely manner so that the machine components are guarded at all times. Since the guard assemblies are attached to the canopy by welding, it may be difficult to remove and replace the guard assemblies. In some cases, a weld cutting/removing operation may have to be performed to remove the damaged guard assemblies. Thus, removal and replacement of the guard assemblies may be a laborious and time-consuming process, affecting overall productivity of the machine.

In some examples, such processes of removing the guard assemblies may damage a structure of the canopy, which is not desired. Accordingly, the machine operation may have to stalled until the guard assemblies are replaced or serviced and/or the canopy is repaired. Thus, the combined repair of the canopy and the servicing/replacement of the guard assembly takes significant amount of labor, cost, and loss of productivity. Additionally, the guard assemblies are typically heavy and bulky, which makes them difficult to handle since they are located high from a ground surface and the guard assemblies also add to a weight of the body portion.

U.S. Pat. No. 10,384,631 describes a guard assembly for a canopy of a truck body. The guard assembly includes a guard configured to be attached to the canopy. The guard includes a first surface and a second surface. The first surface includes a plurality of fins provided in a spaced apart arrangement. The fins are configured to provide structural rigidity to the guard and breakdown material contacting the first surface of the guard.

SUMMARY OF THE DISCLOSURE

In an aspect of the present disclosure, a guard assembly is provided. The guard assembly is adapted to be removably coupled to a canopy of a machine. The guard assembly includes a roof portion defining a first end, a second end defined opposite to the first end, and a first length. The guard assembly also includes at least two bracket members fixedly coupled to the roof portion proximate to the second end of the roof portion. The at least two bracket members define a plurality of first through-holes and a plurality of second through-holes. Each of the plurality of first and second through-holes aligns with a corresponding aperture in the canopy to receive a mechanical fastener therethrough. The guard assembly further includes at least two first support structures spaced apart along the first length defined by the roof portion. Each of the at least two first support structures is fixedly coupled to the roof portion and a corresponding bracket member of the at least two bracket members. The guard assembly includes at least one second support structure extending along the first length defined by the roof portion. At least one second support structure is fixedly coupled to the roof portion and at least two first support structures.

In another aspect of the present disclosure, a canopy for a machine is provided. The canopy includes a frame member defining a plurality of apertures. The canopy also includes a plurality of guard assemblies adapted to be removably coupled to the frame member. Each of the plurality of guard assemblies includes a roof portion defining a first end, a second end defined opposite to the first end, and a first length. Each of the plurality of guard assemblies also includes at least two bracket members fixedly coupled to the roof portion proximate to the second end of the roof portion. The at least two bracket members define a plurality of first through-holes and a plurality of second through-holes. Each of the plurality of first and second through-holes aligns with a corresponding aperture of the plurality of apertures in the frame member to receive a mechanical fastener therethrough. Each of the plurality of guard assemblies further includes at least two first support structures spaced apart along the first length defined by the roof portion. Each of the at least two first support structures is fixedly coupled to the roof portion and a corresponding bracket member of the at least two bracket members. Each of the plurality of guard assemblies includes at least one second support structure extending along the first length defined by the roof portion. The at least one second support structure is fixedly coupled to the roof portion and the at least two first support structures.

Other features and aspects of this disclosure will be apparent from the following description and the accompanying drawings.

DETAILED DESCRIPTION

Figure 1:
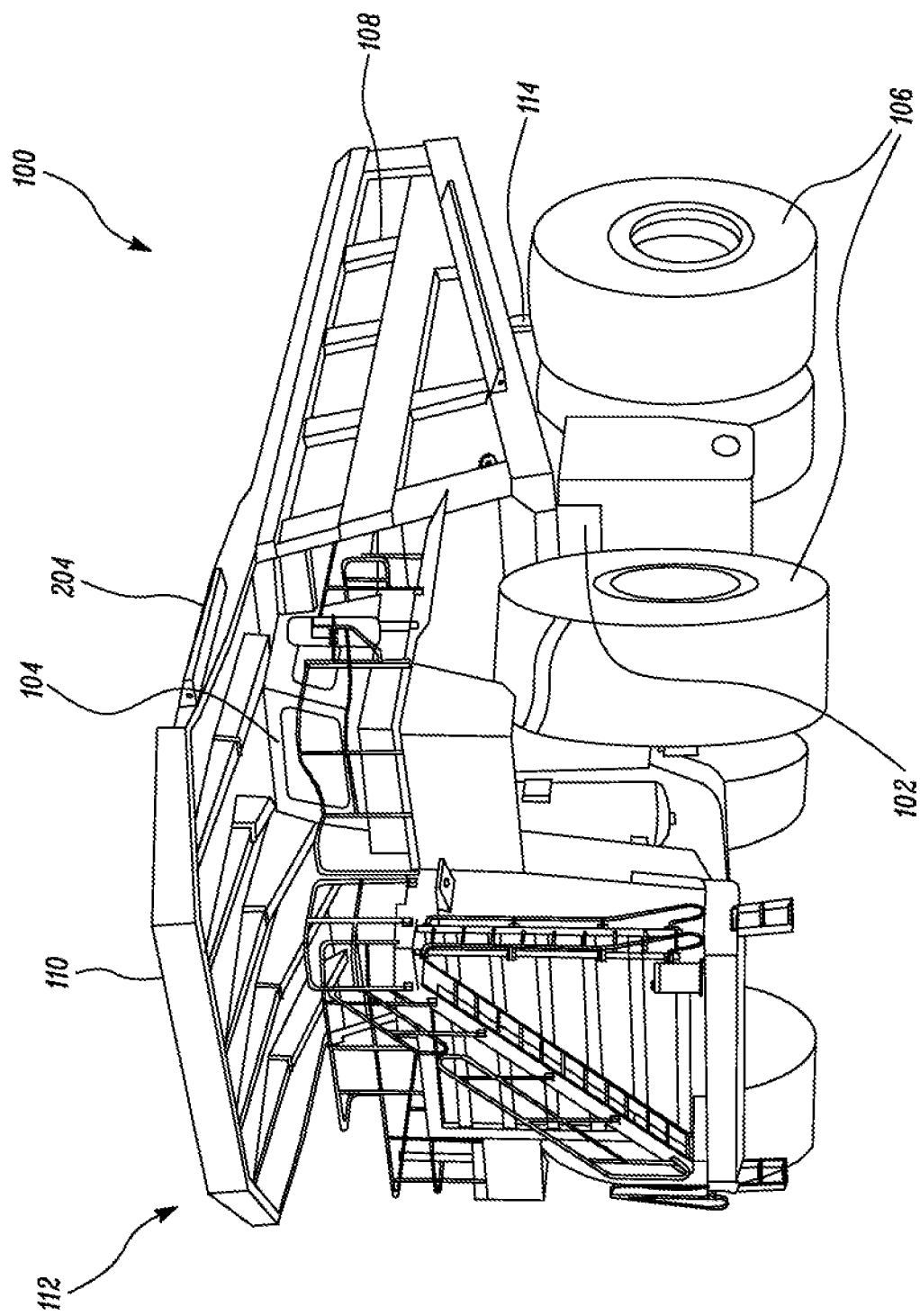
FIG. 1 is a perspective view of a machine, according to an embodiment of the present disclosure.

Wherever possible, the same reference numbers will be used throughout the drawings to refer to the same or like parts. Referring to FIG. 1, a perspective view of an exemplary machine 100 is illustrated. The machine 100 is embodied as a large mining truck that may be used in high-production mining and heavy-duty construction environment. Alternatively, the machine 100 may be embodied as other trucks, such as dump trucks or haul trucks that may be used for transporting construction equipment from one job site to another job site.

The machine 100 includes a frame 102. The frame 102 supports a power source, such as an engine or batteries, thereon. Further, the machine 100 includes an operator cabin 104. The operator cabin 104 includes provision for an operator to sit and also includes various controls to operate the machine 100. The machine includes a number of wheels 106. The wheels 106 allow movement of the machine 100 on ground surfaces.

The machine 100 also includes a truck body 108 coupled to the frame 102. The truck body 108 is pivotally attached to the frame 102. The truck body 108 is adapted to hold payload therein. More particularly, the truck body 108 pivots about at least one pin 114 and moves from a first position (shown in FIG. 1) to a second position (not shown). The second position is a position in which the machine 100 is in a dumping mode. This movement of the truck body 108 is controlled by one or more actuators (not shown).

During mining operation, the truck body 108 carries the payload, and the machine 100 transports the payload from one location to another for dumping. The truck body 108 may be loaded with the payload when the truck body 108 is in the first position. After moving to the dumping location, the truck body 108 may be actuated to move to the second position for dumping the payload. Although the machine 100 is illustrated as a mining truck herein, those skilled in the art will appreciate that the machine 100 may be any other known machine having a canopy.

Further, the machine 100 includes a canopy 110 disposed at a front portion 112 of the machine 100 and extending from the truck body 108. The canopy 110 may cover/guard the operator cabin 104 and other components of the machine 100 from payload and other objects, such as rocks or debris, falling on the machine 100 during machine operation.

Figure 2:
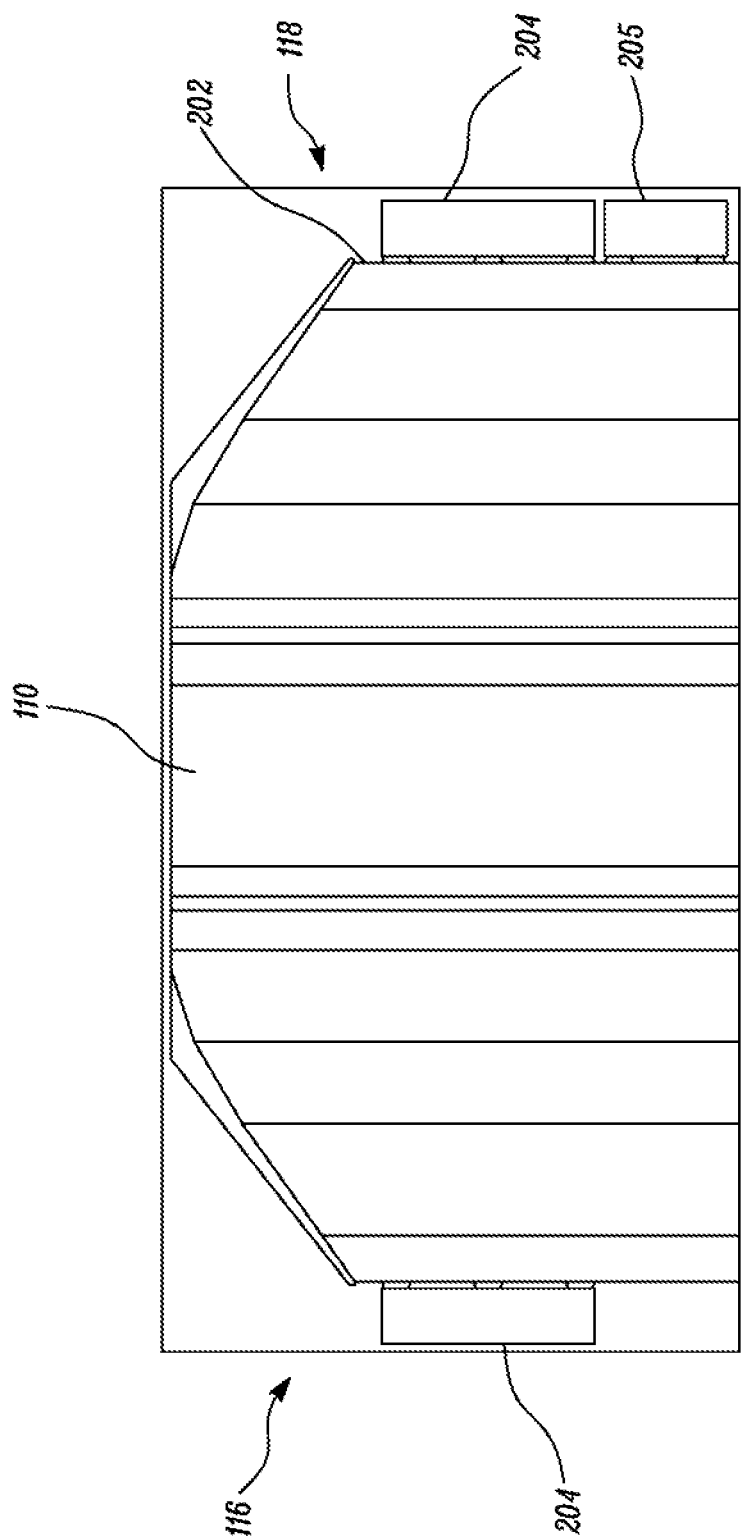
FIG. 2 illustrates a top view of a canopy associated with the machine of FIG. 1.

Referring to FIG. 2, a top view of the canopy 110 is illustrated. The canopy 110 defines a left side 116 and a right side 118. The canopy 110 includes a frame member 202. In the illustrated embodiment, the frame member 202 includes an outer surface 207 (shown in FIGS. 3 and 4) having a generally planar profile. Alternatively, a shape of the outer surface 207 may vary based on a design of the canopy 110, without any limitations. The frame member 202 defines a number of apertures 203 (shown in FIG. 4). Further, the frame member 202 defines a first height "H1" (shown in FIG. 5) and a second height "H2" (shown in FIG. 5). In the illustrated example, the first height "H1" is greater than the second height "H2". Further, the canopy 110 includes a number of guard assemblies 204, 205 that are removably coupled to the frame member 202 of the canopy 110. In an embodiment, the guard assembly 204 is removably coupled to the frame member 202 by using a number of mechanical fasteners 303 (shown in FIGS. 4 and 5), which will be explained later in this section.

In the illustrated embodiment, the right side 118 and the left side 116 of the canopy 110 includes two guard assemblies 204, 205 and one guard assembly 204, respectively. The guard assemblies 204 may be used to guard rear-view mirrors of the machine 100 and the guard assembly 205 may be used to guard a muffler or another attachment of the machine 100. In some other embodiments, the number of guard assemblies 204, 205 on the left side 116 and the right side 118 may vary, as per application requirements. Further, the location of the guard assemblies 204, 205 on the canopy 110 may also vary, as per application requirements.

Figure 3:
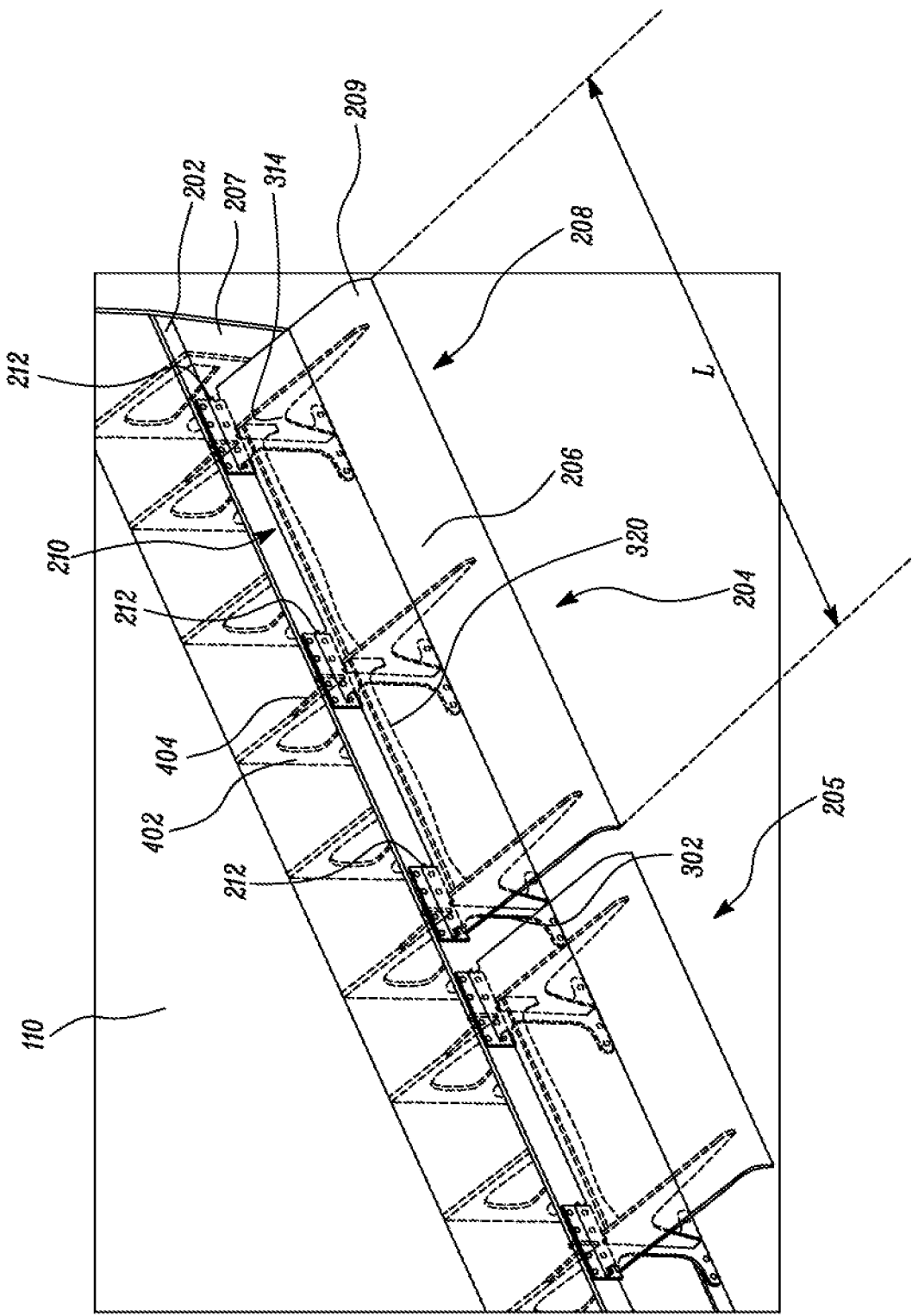
FIG. 3 is a perspective view illustrating two guard assemblies associated with the canopy of FIG. 2, according to an embodiment of the present disclosure.

Referring to FIG. 3, a perspective view of the guard assemblies 204, 205 removably coupled to the frame member 202 of the canopy 110 is illustrated. It should be noted that each of the guard assemblies 204, 205 is connected in a same manner to the frame member 202. Further, each of the guard assemblies 204, 205 includes similar components and design. Therefore, this section will now be explained in relation to a single guard assembly 204 associated with the right side 118 of the canopy 110. However, the details provided below is equally applicable to other guard assemblies 204, 205 disposed at the left and right sides 116, 118, respectively, of the canopy 110, without any limitations.

The guard assembly 204 includes a roof portion 206. The roof portion 206 defines a first end 208, a second end 210 defined opposite to the first end 208, and a first length "L". The second end 210 is positioned against and proximate to the frame member 202 of the canopy 110. The roof portion 206 includes a curved portion 209 defined proximate to the first end 208. The curved portion 209 allows materials to deflect and fall on the ground surface. The curved portion 209, and more specifically, the second end 210 provides corner stiffness and support for the roof portion 206 and eliminates a requirement of additional support structures, such as gussets. The roof portion 206 also includes two or more extending portions 212 defined proximate to the second end 210. In the illustrated example, the roof portion 206 includes three extending portions 212. The extending portions 212 have a generally dovetail shaped structure.

Figure 4:
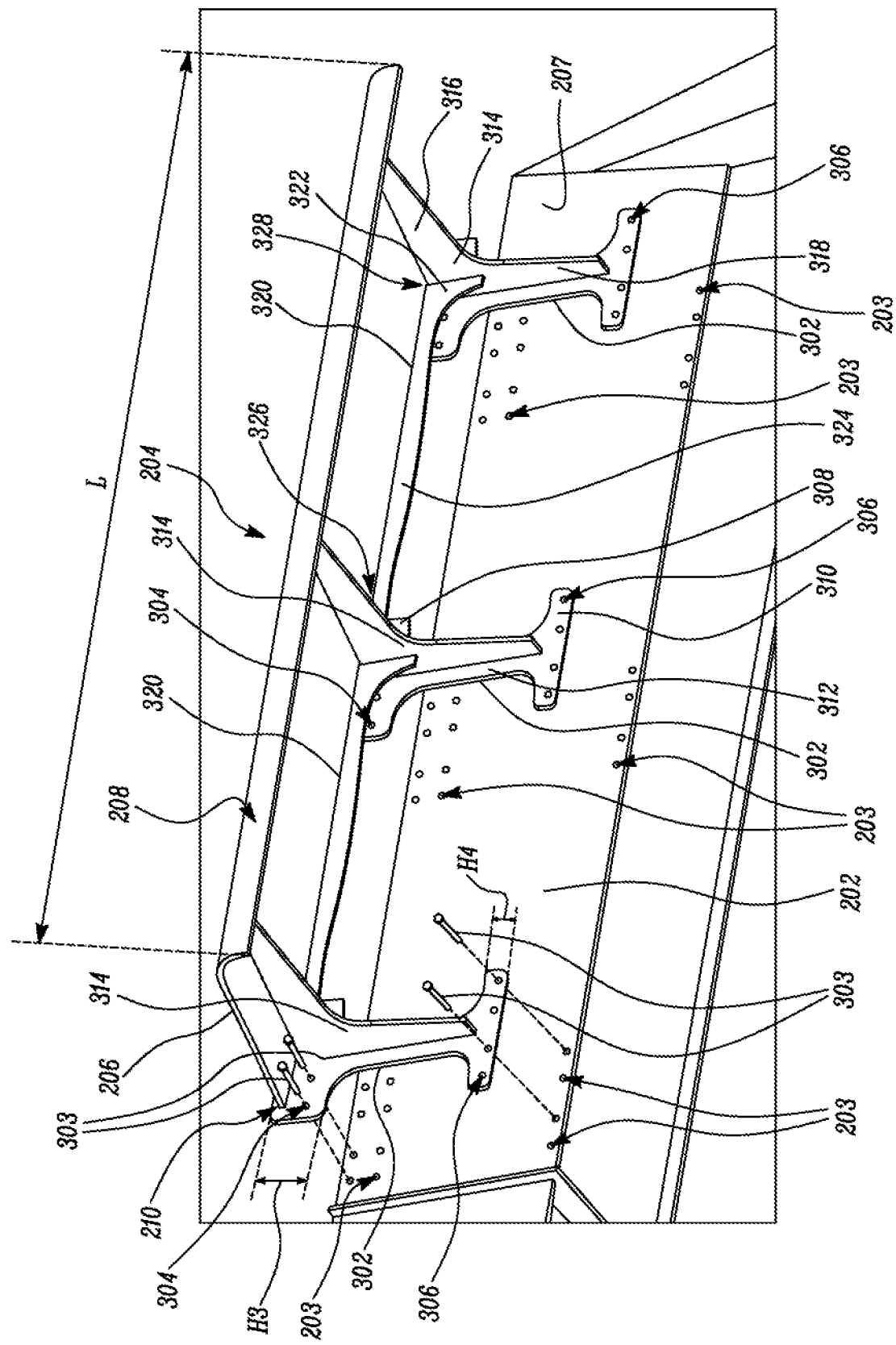
FIG. 4 is an exploded view illustrating the guard assembly at a right side of the canopy and a structure of the canopy of FIG. 2.

Referring now to FIG. 4, the guard assembly 204 includes two or more bracket members 302 fixedly coupled to the roof portion 206 proximate to the second end 210 of the roof portion 206. In the illustrated embodiment, the guard assembly 204 include three bracket members 302. Alternatively, a total number of the bracket members 302 may vary based on the first length "L" of the roof portion 206. Each of the bracket members 302 is substantially perpendicular to the roof portion 206. As illustrated, each of the bracket members 302 is substantially I-shaped. In some embodiments, a shape of the bracket members 302 may vary, for example, the bracket members 302 may have a rectangular shape or a square shape, as per design requirements.

The bracket members 302 define a number of first through-holes 304 and a number of second through-holes 306. Each of the first through-holes 304 and the second through-holes 306 aligns with a corresponding aperture 203 of the number of apertures 203 in the frame member 202 to receive the mechanical fastener 303. More particularly, the guard assembly 204 includes the number of mechanical fasteners 303 for removably coupling the guard assembly 204 to the frame member 202. It should be noted that for explanatory purposes only some of the mechanical fasteners 303 are illustrated in the accompanying figures. However, for each of the bracket members 302, the guard assembly 204 includes eight mechanical fasteners 303 receivable within the first through-holes 304 and four mechanical fasteners 303 receivable within the second through-holes 306. The number of mechanical fasteners 303 may vary depending on a size and a haul capacity of the machine 100. Additionally, a configuration of pattern of the first and second through-holes 304, 306 may also vary. Furthermore, a spacing between each of the first through-holes 304 and a spacing between each of the second through-holes 306 may vary, depending on application requirements. The mechanical fasteners 303 are embodied as bolts herein. In other embodiments, the mechanical fasteners 303 may be embodied as screws.

Further, each of the bracket members 302 includes a first portion 308 fixedly coupled to the roof portion 206. Specifically, the first portions 308 are fixedly coupled to the corresponding extended portions 212 (see FIG. 3) of the roof portion 206. In an embodiment, the first portion 308 may be welded to the roof portion 206. The first portion 308 defines a third height "H3". The third height "H3" is equal to the first height "H1" (see FIG. 5) of the frame member 202. The first portion 308 defines the number of first through-holes 304. More particularly, the first portion 308 defines eight first through-holes 304. Each of the bracket members 302 also includes a second portion 310. The second portion 310 is disposed opposite to the first portion 308 and substantially parallel to the first portion 308. The second portion 310 defines a fourth height "H4". The fourth height "H4" is equal to the second height "H2" (see FIG. 5) of the frame member 202. In the illustrated example, the third height "H3" is greater than the fourth height "H4". The second portion 310 defines the number of second through-holes 306. More particularly, the second portion 310 defines four second through-holes 306. Each of the bracket members 302 further includes a third portion 312 extending between the first portion 308 and the second portion 310. The third portion 312 is substantially perpendicular to the first and second portions 308, 310.

The guard assembly 204 also includes two or more first support structures 314 spaced apart along the first length "L" defined by the roof portion 206. In the illustrated example, the guard assembly 204 includes three first support structures 314. Each of the first support structures 314 is fixedly coupled to the roof portion 206 and a corresponding bracket member 302 of the bracket members 302. In an embodiment, each of the first support structures 314 may be welded to the roof portion 206 and the corresponding bracket member 302. A total number of the first support structures 314 corresponds to the total number of the bracket members 302. Thus, the total number of the first support structures 314 varies based on the total number of the bracket members 302.

Each of the first support structures 314 includes a first arm 316 coupled to the roof portion 206 and a second arm 318 coupled to the corresponding bracket member 302 of the bracket members 302. In an embodiment, the first arm 316 and the second arm 318 of each of the first support structures 314 may be welded to the roof portion 206 and the corresponding bracket member 302, respectively.

The guard assembly 204 further includes one or more second support structures 320 extending along the first length "L" defined by the roof portion 206. Each of the second support structures 320 is fixedly coupled to the roof portion 206 and the first support structures 314. In an embodiment, each of the second support structures 320 may be welded to the roof portion 206 and the first support structures 314. In the illustrated example, the guard assembly 204 includes two second support structures 320. Each of the second support structures 320 extends between the first support structures 314 that are disposed adjacent to each other.

Furthermore, each of the second support structures 320 includes a pair of third arms 322 defined at opposing ends 326, 328 of each of the second support structures 320. The pair of third arms 322 is fixedly coupled to a corresponding first support structure 314 of the first support structures 314. The pair of third arms 322 are fixedly coupled to the first support structures 314 that are disposed adjacent to each other. Each of the second support structures 320 also includes an intermediate portion 324 extending between the pair of third arms 322. The intermediate portion 324 is fixedly coupled to the roof portion 206. Specifically, the intermediate portion 324 may be welded to the roof portion 206.

Figure 5:
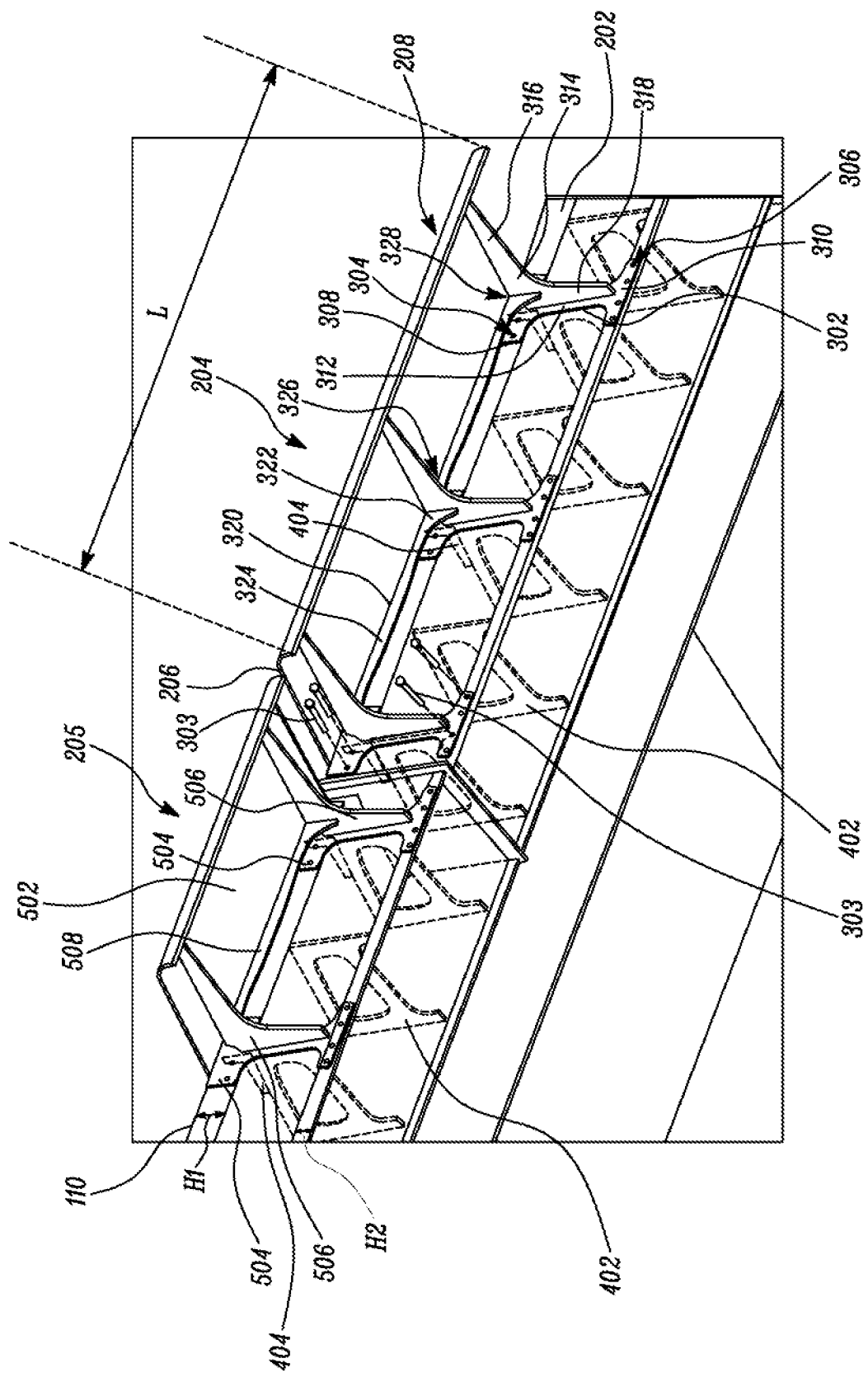
FIG. 5 illustrates a perspective view of the guard assemblies of FIG. 3.
Figure 6:
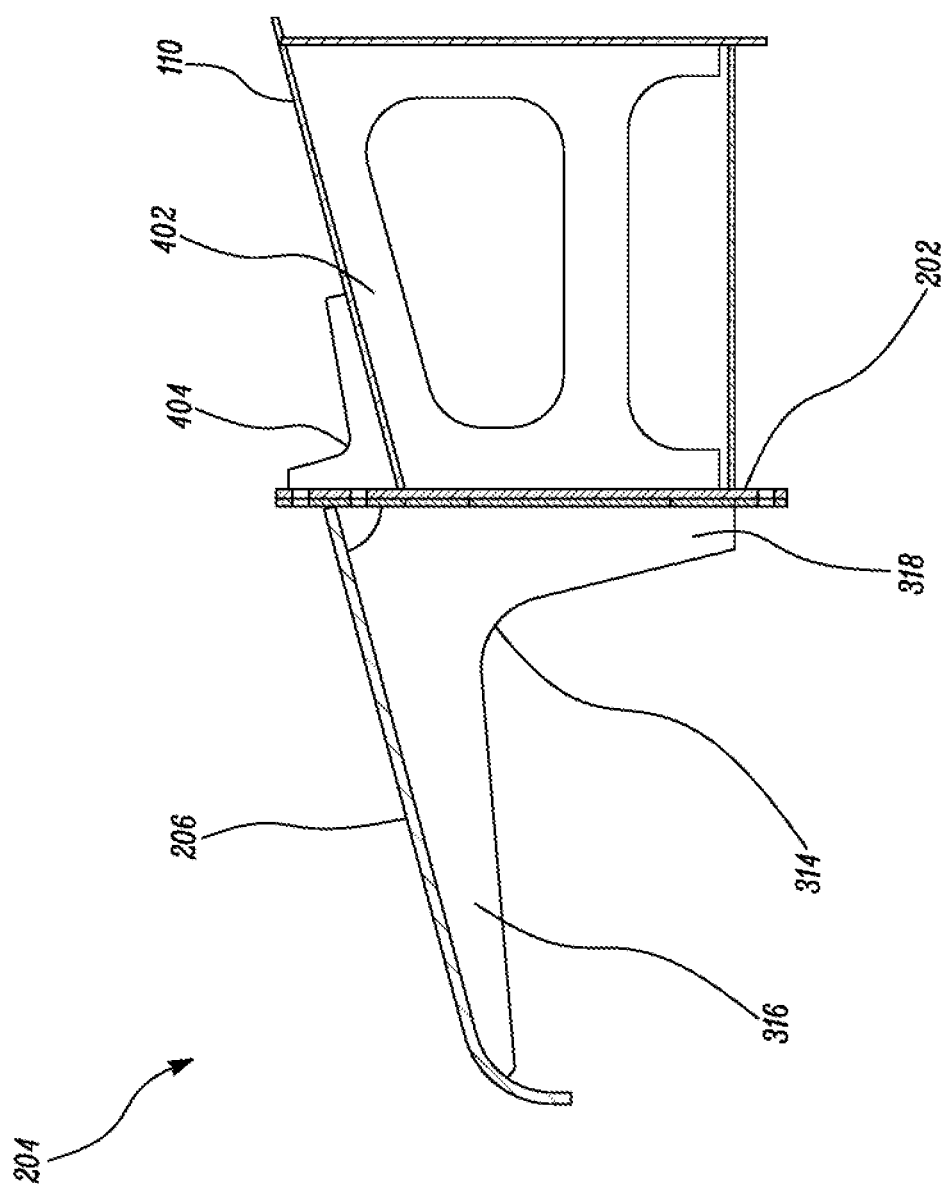
FIG. 6 illustrates a sectional side view of the guard assembly of FIG. 4.

Referring now to FIGS. 5 and 6, the canopy 110 includes a number of first gussets 402. The first gussets 402 are spaced apart along the first length "L" defined by the roof portion 206 outside the guard assembly 204 and inside the canopy 110. The first gussets 402 may be welded to the frame member 202. In the illustrated example, the guard assembly 204 includes five first gussets 402 arranged along the first length "L" of the roof portion 206, without any limitations. Out of the number of first gussets 402, two or more first gussets 402 align with a corresponding first support structure 314 of the two or more first support structures 314. As the guard assembly 204 includes three first support structures 314, three first gussets 402 are in alignment with the corresponding first support structures 314. When the guard assembly 204 is coupled to the canopy 110, a portion of the frame member 202 and a portion of the bracket members 302 lie between the first gussets 402 and the corresponding first support structures 314. It should be noted that a design of the first gussets 402 shown herein is exemplary in nature and the first gussets 402 may include any other design, without any limitations.

Further, the canopy 110 includes two or more second gussets 404. The second gussets 404 are spaced apart along the first length "L" defined by the roof portion 206 outside the guard assembly 204 and inside the canopy 110. The second gussets 404 may be welded to the frame member 202. Each of the two or more second gussets 404 aligns with a corresponding first support structure 314 of the two or more first support structures 314. As the guard assembly 204 includes three first support structures 314, three second gussets 404 are in alignment with the corresponding first support structures 314.

When the guard assembly 204 is coupled to the canopy 110, a portion of the frame member 202 and a portion of the bracket members 302 lie between the second gussets 404 and the corresponding first support structures 314. Further, the second gussets 404 are also in alignment with the corresponding first gussets 402. More particularly, the second gussets 404 are disposed vertically above the corresponding first gussets 402. It should be noted that a shape of the second gussets 404 is substantially similar to a shape of the first support structures 314. However, the shape of the second gussets 404 may vary, as per application requirements. It should be further noted that a design of the first gussets 402 shown herein is exemplary in nature and the first gussets 402 may include any other design, without any limitations.

Details of the guard assembly 205 will now be explained in relation to FIG. 5. It should be noted that the guard assembly 205 is coupled to the canopy 110 using mechanical fasteners (not shown) that are similar to the mechanical fasteners 303 associated with the guard assembly 204. As illustrated, the guard assembly 205 includes a roof portion 502 that is similar in design to the roof portion 206 of the guard assembly 204. The guard assembly 205 also includes a pair of bracket members 504. Each of the bracket members 504 is similar in design to the bracket members 302 of the guard assembly 204. Further, the guard assembly 205 includes a pair of first support structures 506. Each of the first support structures 506 is similar in design to the first support structures 314 of the guard assembly 204. The guard assembly 205 also includes a second support structure 508. The second support structure 508 is similar in design to the second support structure 320 of the guard assembly 204. Further, the first support structures 506 are in alignment with the corresponding first and second gussets 402, 404.

Figure 7:
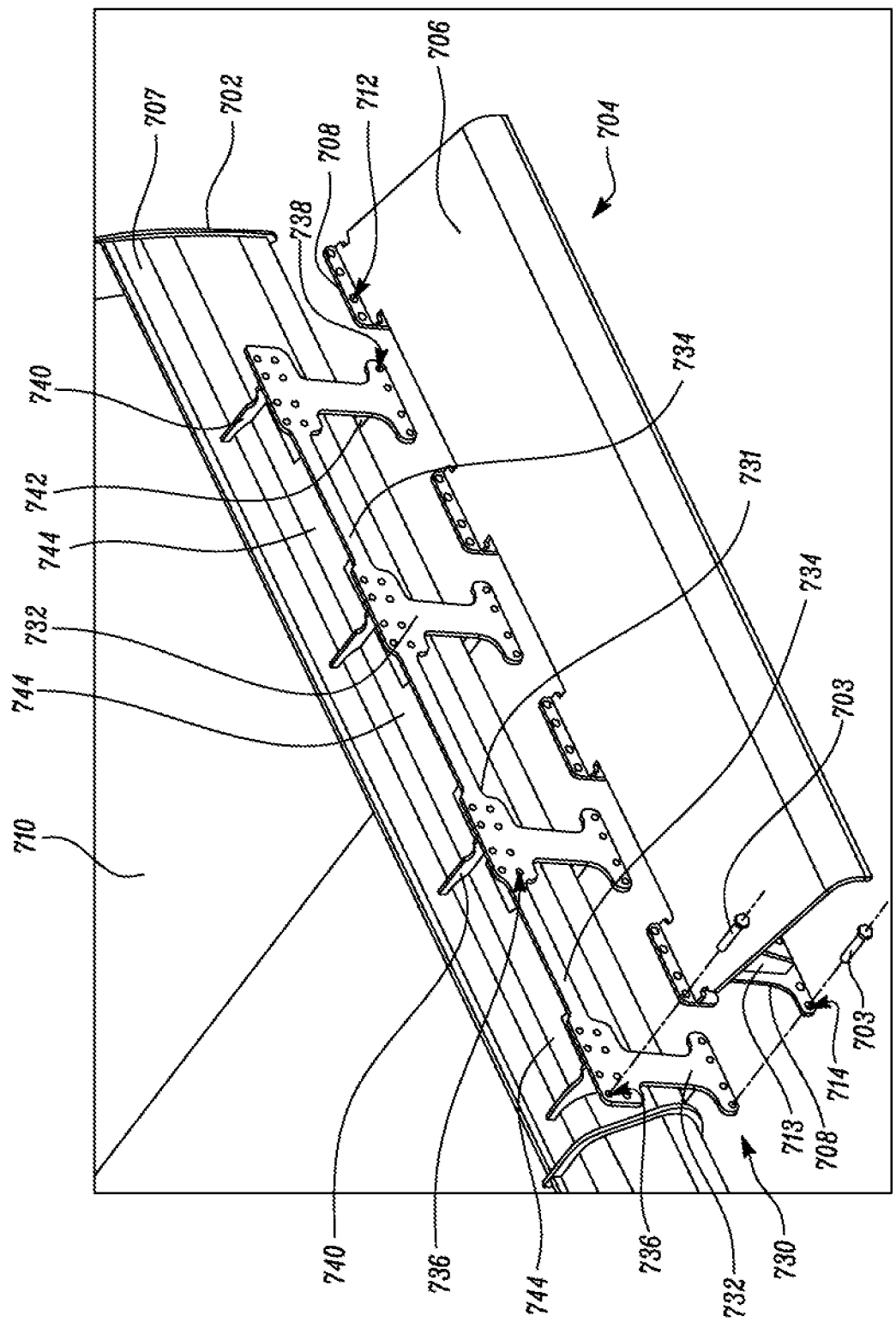
FIG. 7 is an exploded view illustrating a guard assembly associated with another canopy, according to an embodiment of the present disclosure.
Figure 8:
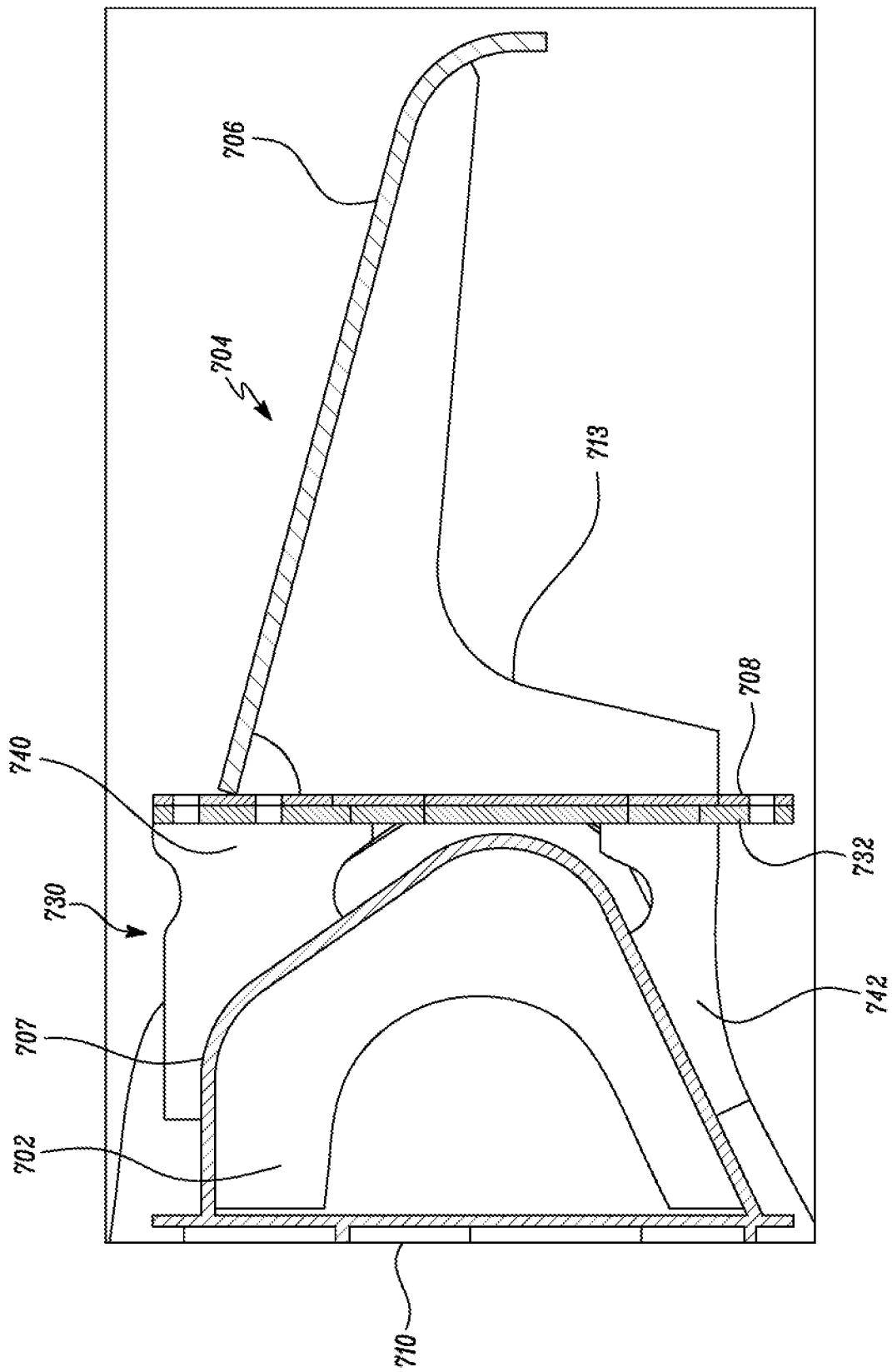
FIG. 8 illustrates a sectional side view of the guard assembly of FIG. 7.

FIGS. 7 and 8 illustrate another embodiment of the present disclosure. In this embodiment, a canopy 710 associated with the machine 100 includes a frame member 702. As shown in FIG. 7, the frame member 702 includes an outer surface 707 having a curved profile. Further, a guard assembly 704 is removably coupled to the frame member 702 of the canopy 710 using a number of mechanical fasteners 703.

As illustrated, the guard assembly 704 includes a roof portion 706 that is similar in design to the roof portion 206 of the guard assembly 204 explained in reference to FIGS. 2 to 6. The guard assembly 704 also includes a number of bracket members 708. In the illustrated embodiment, the guard assembly 704 includes four bracket members 708. Each of the bracket members 708 is similar in design to the bracket members 302 of the guard assembly 204 explained in reference to FIGS. 2 to 5. Moreover, the guard assembly 704 includes four first support structures 713 similar to the first support structures 314 explained in reference to FIGS. 2 to 6. The guard assembly 704 further includes three second support structures (not shown) similar to the second support structures 320 explained in reference to FIGS. 2 to 5. The bracket members 708 define a number of first through-holes 712 and a number of second through-holes 714.

The canopy 710 further includes an intermediate structure 730 that allows the guard assembly 704 to be removably coupled to the frame member 702. The intermediate structure 730 includes a support plate 731. The guard assembly 704 is removably coupled to the support plate 731 by the number of mechanical fasteners 703. Further, the support plate 731 includes a number of brackets 732 spaced apart from each other. In an embodiment, each of the brackets 732 may be similar in design to the bracket members 708 of the guard assembly 704. In other embodiments, the design of each of the brackets 732 may be different from the bracket members 708 of the guard assembly 704. In the illustrated example, the support plate 731 includes four brackets 732.

Each of the brackets 732 defines a number of third through-holes 736 and a number of fourth through-holes 738. Each of the first through-holes 712 aligns with a corresponding third through-hole 736 to receive the mechanical fastener 703 therethrough. Further, each of the second through-holes 714 aligns with a corresponding fourth through-hole 738 to receive the mechanical fastener 703 therethrough. Thus, the number of mechanical fasteners 703 removably couple the guard assembly 704 to the intermediate structure 730. It should be noted that for explanatory purposes only some of the mechanical fasteners 703 are illustrated in the accompanying figures. However, eight mechanical fasteners 703 are receivable within the first and third through-holes 712, 736 and four mechanical fasteners 703 are receivable within the second and fourth through-holes 714, 738. It should be noted that the number of mechanical fasteners 703 may vary depending on a size and a haul capacity of the machine 100. Additionally, a configuration of pattern of the third and fourth through-holes 736, 738 may also vary. Further, the intermediate structure 730 also includes a number of plates 734 extending between adjacently disposed brackets 732. In the illustrated example, the intermediate structure 730 includes three plates 734. The plates 734 are generally rectangular in shape. In an example, the brackets 732 and the plates 734 may be manufactured as a unitary component. Alternatively, the brackets 732 and the plates 734 may be manufactured as separate components that are welded together to form the intermediate structure 730.

As shown in FIGS. 7 and 8, the intermediate structure 730 also includes a number of third gussets 740 and a number of fourth gussets 742 extending between the brackets 732 and the frame member 702. More particularly, a third gusset 740 and a fourth gusset 742 extends between each of the brackets 732 and the frame member 702. In other examples, the intermediate structure 730 may include a single gusset extending between each of the brackets 732 and the frame member 702. In such examples, a shape of the single gusset that contacts the frame member 702 may correspond to the shape of the outer surface 707.

Further, the intermediate structure 730 includes a number of plate members 744 (shown in FIG. 7). It should be noted that the plate members 744 cover an opening that otherwise exists between the support plate 731 and the frame member 702. The plate members 744 extend between adjacently disposed third gussets 740. In an example, each of the plate members 744 is coupled to adjacently disposed third gussets 740 and the plates 734 (see FIG. 7) by welding.

The intermediate structure 730 is coupled to the frame member 702 of the canopy 710. Specifically, the third and fourth gussets 740, 742 may be welded to the outer surface 707 of the frame member 702 to couple the intermediate structure 730 to the canopy 710. In the illustrated example, various parts of the intermediate structure 730, such as the support plate 731, the third gussets 740, the fourth gussets 72, and the plate members 744 are manufactured as separate components that are welded to each other. However, in other examples, the entire intermediate structure 730 may be manufactured as a one-piece assembly. It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

This section will now be described in relation to the guard assembly 204 associated with the machine 100 at the right side 118 of the canopy 110. The details provided below is equally applicable to the other guard assemblies 204, 205 at the left and right sides 116, 118 of the canopy 110 and the guard assembly 704 associated with the canopy 710. Further, the guard assembly 204 described herein can be coupled to canopy of a variety of machines.

The present disclosure provides a time efficient, cost effective, and simple technique for removably coupling the guard assembly 204 to the canopy 110 of the machine 100. Further, the guard assembly 204 includes a robust design and reduced weight as compared to guard assemblies currently available in the market. Further, the guard assembly 204 may be retrofitted on existing machines with modifications to the canopy 110. The bracket members 302 defining the first through-holes 304 and the second through-holes 306 are utilized to couple the guard assembly 204 to the canopy 110. The first through-holes 304 and the second through-holes 306 align with the apertures 203 in the frame member 202 to receive the mechanical fasteners 303 that allows a removable attachment of the guard assembly 204 with the canopy 110. The first through-holes 304 and the second through-holes 306 are spaced along the bracket members 302 such that any load exerted on the guard assembly 204 by materials falling thereon is evenly distributed across the bracket members 302. Moreover, the first through-holes 304 and the second through-holes 306 are spaced apart perpendicularly so that when load is applied to the guard assembly 204 from falling materials, tensile and shear loads experienced by the fasteners 303 in the first through-holes 304 will be counteracted by opposing forces created by the fasteners 303 in the second through-holes 306 through contact between the frame member 202 and the bracket members 302.

During an event of damage of the guard assembly 204 due to rocks, debris, or other objects/materials falling on the guard assembly 204, the guard assembly 204 may be easily removed and replaced or serviced, as per requirements. Further, in the event of damage to the guard assembly 204, the guard assembly 204 does not damage the canopy 110. The coupling of the guard assemblies 204 to the canopy 110 by using the mechanical fasteners 303 provides easy installation and removal of the guard assembly 204. As the mechanical fasteners 303 can be easily accessed during servicing or replacement procedures, an ease in serviceability and replacement of the guard assembly 204 may consequently save time and thereby improve efficiency and productivity associated with the machine 100.

Further, the roof portion 206 includes the extending portions 212 that are welded with the bracket members 302. The shape of the extending portions 212 are decided such that a strength of the weld between the roof portion 206 and the bracket members 302 is improved. In the disclosed guard assembly 204, each of the first and second support structures 314, 320 provides structural rigidity and support to the guard assembly 204. Furthermore, the first and second gussets 402, 404 in the canopy 110 provide an additional support and add to an overall strength of the guard assembly 204. When rocks, debris, or other material falls on the guard assembly 204, the first and second support structures 314, 320 and the first and second gussets 402, 404 assist in distributing loads evenly across the guard assembly 204.

The first and second heights "H1", "H2" of the frame member 202 are selected to allow the bracket members 302 to be mechanically coupled to the frame member 202 without requiring additional mounting brackets or blocks welded to a side of the frame member 202 that are substantially heavy and costly to incorporate. Moreover, the first and second heights "H1", "H2" of the frame member 202 may be equal to the third and fourth heights "H3", "H4", respectively, of each of the bracket members 302, which provides ease of mounting the bracket members 302 against the frame member 202. In some examples, the first and second heights "H1", "H2" of the frame member 202 may not be equal to the third and fourth heights "H3", "H4", respectively.

It should be further noted that the guard assembly 204, 205, 704 described herein may be coupled to the corresponding frame member 202, 702 of different configurations. For example, the guard assemblies 204, 205 may be coupled to the frame member 202 having a generally planar outer profile. In other examples, the guard assembly 704 may be coupled to the frame member 702 having a curved outer profile. Accordingly, the present disclosure provides a time efficient and cost-effective technique for coupling the guard assembly 704 to the canopy 710 having the curved frame member 702. Further, the intermediate structure 730 allows coupling of the guard assembly 704 to the frame member 702. The inclusion of the intermediate structure 730 provides a simple way for coupling the guard assembly 704 to the frame member 702. Further, the third and fourth gussets 740, 742 provide structural rigidity and support to the intermediate structure 730 and the guard assembly 704.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A guard assembly adapted to be removably coupled to a canopy of a machine, the guard assembly comprising:
    a roof portion defining a first end, a second end defined opposite to the first end, and a first length;
    at least two bracket members fixedly coupled to the roof portion proximate to the second end of the roof portion, the at least two bracket members defining a plurality of first through-holes and a plurality of second through-holes, wherein each of the plurality of first and second through-holes aligns with a corresponding aperture in the canopy to receive a mechanical fastener therethrough;
    at least two first support structures spaced apart along the first length defined by the roof portion, wherein each of the at least two first support structures is fixedly coupled to the roof portion and a corresponding bracket member of the at least two bracket members; and
    at least one second support structure extending along the first length defined by the roof portion, wherein the at least one second support structure is fixedly coupled to the roof portion and the at least two first support structures.

2. The guard assembly of claim 1, wherein the roof portion includes a curved portion defined proximate to the first end thereof.

3. The guard assembly of claim 1, wherein the roof portion includes at least two extending portions defined proximate to the second end thereof.

4. The guard assembly of claim 1, wherein each of the at least two bracket members is substantially perpendicular to the roof portion.

5. The guard assembly of claim 1, wherein each of the at least two bracket members is substantially I-shaped.

6. The guard assembly of claim 1, wherein each of the at least two bracket members includes:
    a first portion adapted to be fixedly coupled to the roof portion, wherein the first portion defines the plurality of first through-holes;
    a second portion disposed opposite to the first portion and substantially parallel to the first portion, wherein the second portion defines the plurality of second through-holes; and
    a third portion extending between the first and second portions, wherein the third portion is substantially perpendicular to the first and second portions.

7. The guard assembly of claim 1, wherein each of the at least two first support structures includes a first arm adapted to couple to the roof portion and a second arm adapted to couple to a corresponding bracket member of the at least two bracket members.

8. The guard assembly of claim 1, wherein the at least one second support structure includes:
- a pair of third arms defined at opposing ends of the at least one second support structure, wherein each of the pair of third arms is fixedly coupled to a corresponding first support structure of the at least two first support structures; and
- an intermediate portion extending between the pair of third arms, wherein the intermediate portion is fixedly coupled to the roof portion.

9. The guard assembly of claim 1, wherein the canopy includes a plurality of first gussets, and wherein each of at least two first gussets of the plurality of first gussets align with a corresponding first support structure of the at least two first support structures.

10. The guard assembly of claim 1, wherein the canopy includes at least two second gussets, and wherein each of the at least two second gussets align with a corresponding first support structure of the at least two first support structures.

11. A canopy for a machine, the canopy comprising:
- a frame member defining a plurality of apertures; and
- a plurality of guard assemblies adapted to be removably coupled to the frame member, wherein each of the plurality of guard assemblies includes:
  - a roof portion defining a first end, a second end defined opposite to the first end, and a first length;
  - at least two bracket members fixedly coupled to the roof portion proximate to the second end of the roof portion, the at least two bracket members defining a plurality of first through-holes and a plurality of second through-holes, wherein each of the plurality of first and second through-holes aligns with a corresponding aperture of the plurality of apertures in the frame member to receive a mechanical fastener therethrough;
  - at least two first support structures spaced apart along the first length defined by the roof portion, wherein each of the at least two first support structures is fixedly coupled to the roof portion and a corresponding bracket member of the at least two bracket members; and
  - at least one second support structure extending along the first length defined by the roof portion, wherein the at least one second support structure is fixedly coupled to the roof portion and the at least two first support structures.

12. The canopy of claim 11, wherein the roof portion includes a curved portion defined proximate to the first end thereof.

13. The canopy of claim 11, wherein the roof portion includes at least two extending portions defined proximate to the second end thereof.

14. The canopy of claim 11, wherein each of the at least two bracket members is substantially perpendicular to the roof portion.

15. The canopy of claim 11, wherein each of the at least two bracket members is substantially I-shaped.

16. The canopy of claim 11, wherein each of the at least two bracket members includes:
- a first portion adapted to be fixedly coupled to the roof portion, wherein the first portion defines the plurality of first through-holes;
- a second portion disposed opposite to the first portion and substantially parallel to the first portion, wherein the second portion defines the plurality of second through-holes; and
- a third portion extending between the first and second portions, wherein the third portion is substantially perpendicular to the first and second portions.

17. The canopy of claim 11, wherein each of the at least two first support structures includes a first arm adapted to couple to the roof portion and a second arm adapted to couple to a corresponding bracket member of the at least two bracket members.

18. The canopy of claim 11, wherein the at least one second support structure includes:
- a pair of third arms defined at opposing ends of the at least one second support structure, wherein each of the pair of third arms is fixedly coupled to a corresponding first support structure of the at least two first support structures; and
- an intermediate portion extending between the pair of third arms, wherein the intermediate portion is fixedly coupled to the roof portion.

19. The canopy of claim 11 further comprising a plurality of first gussets, wherein each of at least two first gussets of the plurality of first gussets align with a corresponding first support structure of the at least two first support structures.

20. The canopy of claim 11 further comprising at least two second gussets, wherein each of the at least two second gussets aligns with a corresponding first support structure of the at least two first support structures.

* * * * *